US011835366B2

(12) United States Patent
Sitz et al.

(10) Patent No.: US 11,835,366 B2
(45) Date of Patent: Dec. 5, 2023

(54) ELECTRONIC ASSEMBLY FOR MODULAR PLUG

(71) Applicant: Renalsense Ltd., Jerusalem (IL)

(72) Inventors: Dean Sitz, Wahpeton, ND (US); Jason Moses, Breckenridge, MN (US); Zachary Madsen, Wahpeton, ND (US); Jack Yehoshua Mantinband, Efrat (IL); Joseph Kochba, Yavne (IL)

(73) Assignee: Renalsense Ltd., Jerusalem (IL)

( * ) Notice: Subject to any disclaimer, the term of this patent is extended or adjusted under 35 U.S.C. 154(b) by 0 days.

(21) Appl. No.: 17/723,469

(22) Filed: Apr. 19, 2022

(65) Prior Publication Data

US 2022/0236087 A1    Jul. 28, 2022

Related U.S. Application Data

(62) Division of application No. 16/970,711, filed as application No. PCT/IL2019/050192 on Feb. 18, 2019, now Pat. No. 11,333,534.

(Continued)

(51) Int. Cl.
*G01D 11/30* (2006.01)
*G01D 11/24* (2006.01)

(52) U.S. Cl.
CPC ........... *G01D 11/30* (2013.01); *G01D 11/245* (2013.01)

(58) Field of Classification Search
CPC ............................ G01D 11/30; G01D 11/245
See application file for complete search history.

(56) References Cited

U.S. PATENT DOCUMENTS 5,829,880 A    11/1998  Diedrich
8,992,260 B2 *  3/2015  Coffey ..................... H04Q 1/13
                                              439/620.22
(Continued)

FOREIGN PATENT DOCUMENTS

CN    103175583      7/2017
DE    102004021303   11/2005
(Continued)

OTHER PUBLICATIONS

The International Search Report (ISR) for PCT/IL2019/050192, dated May 23, 2019, pp. 1-5.
(Continued)

*Primary Examiner* — Jamel E Williams
(74) *Attorney, Agent, or Firm* — McDonnell Boehnen Hulbert & Berghoff LLP

(57) ABSTRACT

Disclosed herein is a sensor unit that is positioned at a location in a conduit for measuring a property of a fluid flowing through the conduit, the sensor unit comprises: a sensor support; a body section including proximal and distal sides and a center having a chamber, the chamber having a lower part and a top part with the lower part providing an open path between the proximal and distal sides of the body section, providing a flow channel through the body section; a socket in the top part of the chamber, the socket configured to receive the sensor support; a gasket located on top of the sensor support; e) a clamp configured to compress and hold the gasket and sensor support in place in the socket; and at least one sensor configured to measure a property of the fluid; wherein the sensor support maintains the at least one sensor in position relative to the walls of the flow channel through the sensor unit and at a constant depth relative to the fluid flowing through the sensor unit.

18 Claims, 5 Drawing Sheets

Related U.S. Application Data

(60) Provisional application No. 62/632,216, filed on Feb. 19, 2018.

(56) References Cited

U.S. PATENT DOCUMENTS

| | | | |
|---|---|---|---|
| 2004/0244511 | A1 | 12/2004 | Hueftle et al. |
| 2011/0092100 | A1* | 4/2011 | Coffey .................... H04Q 1/13 |
| | | | 29/842 |

FOREIGN PATENT DOCUMENTS

| | | |
|---|---|---|
| DE | 202012001121 | 3/2012 |
| DE | 20 2014 103 998 U1 | 9/2014 |
| EP | 2107347 | 8/2016 |
| EP | 3 113 291 A1 | 1/2017 |
| EP | 2100104 | 10/2017 |
| JP | 048917 | 1/1992 |
| JP | 04-210183 | 7/1992 |
| JP | 05-280664 | 10/1993 |
| JP | 2002-174608 | 6/2002 |
| JP | 2003-227740 | 8/2003 |

OTHER PUBLICATIONS

Written Opinion of the International Searching Authority for PCT/IL2019/050192, dated May 23, 2019, pp. 1-5.

\* cited by examiner

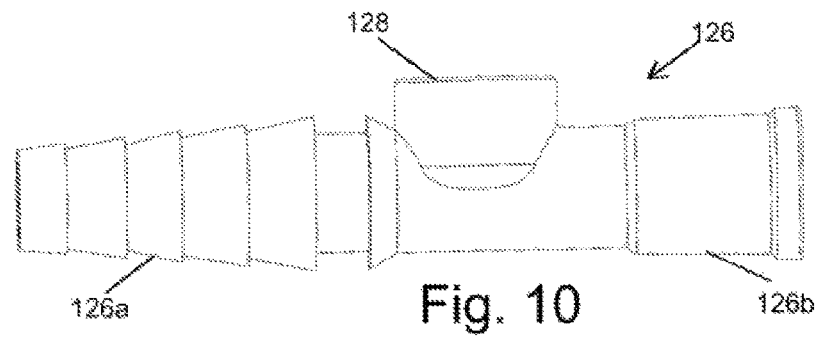
Fig. 10
Prior Art
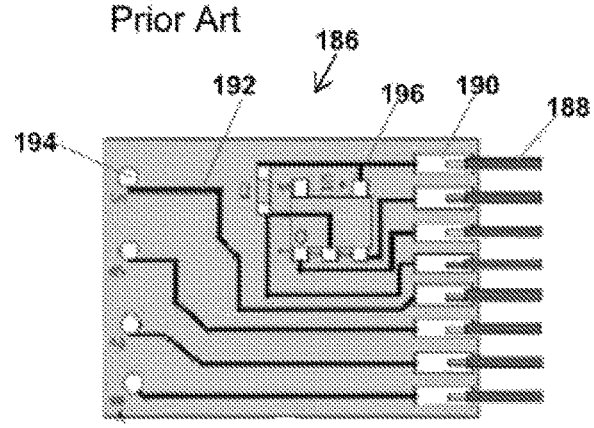
Fig. 11
Fig. 13
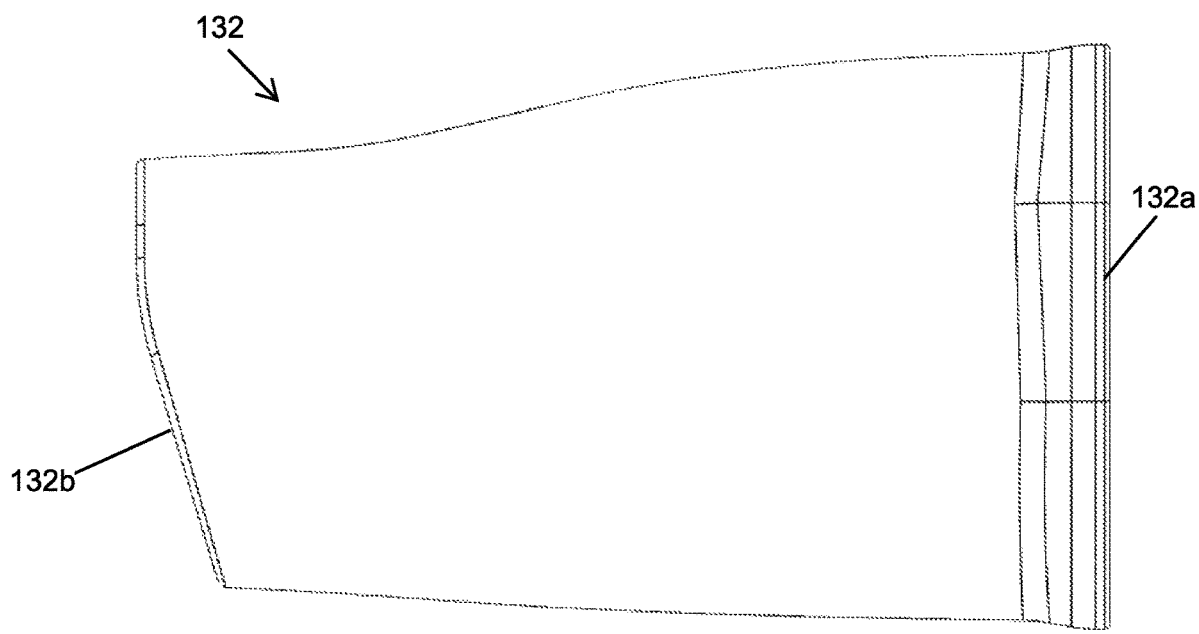
Fig. 12

ELECTRONIC ASSEMBLY FOR MODULAR PLUG

CROSS REFERENCE TO RELATED APPLICATION

This application is a divisional of U.S. patent application Ser. No. 16/970,711, filed Aug. 18, 2020, which is a United States National Phase of International Application No. PCT/IL2019/050192, filed Feb. 18, 2019, which claims priority to U.S. Provisional Patent Application No. 62/632,216, filed Feb. 19, 2018, both of which are incorporated by reference herein in their entirety.

1. INTRODUCTION

Disclosed herein is a sensor unit that is positioned at a location in a conduit for measuring a property of a fluid flowing through the conduit.

2. BACKGROUND

Sensors of various types are used to monitor the properties of fluids flowing through conduits. One of the problems associated with obtaining consistent accurate results is that the properties of the flowing fluid and measurements thereof frequently depend on many factors that are not always easy to reliably reproduce, such as the distance of the sensor from the walls of the conduit, the depth to which the sensor is immersed in the fluid, and characteristics of the walls of the conduit.

It is therefore a purpose of the present invention to provide an apparatus that enables accurate reproducible determinations of properties of fluids flowing through a conduit.

Further purposes and advantages of this invention will appear as the description proceeds.

3. SUMMARY

Provided herein is a sensor unit that is configured to be positioned at a location in a conduit at which it is desired to measure a property of a fluid flowing through the conduit. In certain embodiments, the sensor unit comprises: a) a sensor support; b) a body section including proximal and distal sides and a center having a chamber, the chamber having a lower part and a top part, the lower part providing an open path between the proximal and distal sides of the body section, thereby providing a flow channel through the body section; c) a socket in the top part of the chamber, the socket configured to receive the sensor support; d) a gasket located on top of the sensor support; e) a clamp configured to press down on the gasket, thereby holding the gasket and sensor support in place in the socket; and f) at least one sensor configured to measure a property of the fluid. The sensor support supports the at least one sensor such that the at least one sensor is maintained in position relative to the walls of the flow channel through the sensor unit and at a constant depth relative to the fluid flowing through the sensor unit.

In certain embodiments, the socket comprises shelves on two sides of the chamber that are parallel to side walls on which the sensor support is positioned to form a complete ceiling to the flow channel.

In certain embodiments, the sensor unit of any one of the preceding claims, wherein the body section includes at least one of: a) a sensor unit cover; b) an electric cable connected at a first end to an electric circuit on the sensor support and connected at a second end to a control unit; c) short pieces of tube that project through and out of a proximal wall and a distal wall of the body section respectively; d) a cable guide configured to hold in place an electric cable located at the distal side of the body section; e) at least one sensor located on the sensor support; f) electronic circuitry on the sensor support; g) a proximal connector section configured to be attached at its distal end to a tube that projects through and out of the proximal wall of the body section and at its proximal end to the conduit; and h) a distal connector section configured to be attached at its proximal end to a tube that projects through and out of the distal wall of the body section and at its distal end to the conduit.

In certain embodiments, the at least one sensor is one of: a temperature sensor, a temperature sensor enabled to provide heat, a pH sensor, a pressure sensor, a flow rate sensor, a sensor for detecting a concentration of at least one substance in the fluid, and a sensor to detect the at least one liquid or gas.

In certain embodiments, the sensor support has one of a two dimensional shape and a three dimensional shape. In certain implementations, the sensor support is one of a PCB, a metal plate, a plastic plate, and a ceramic plate.

In certain embodiments, the sensor unit further comprises a check valve downstream of the body section.

In certain embodiment, the gasket is located between the sensor support and the clamp.

In certain embodiments, the clamp comprises an opening through which the electric cable can pass, a cable guide, and two snap-fit legs, wherein each of the snap-fit legs has free end having a latch structure, the snap-fit legs configured to allow the latch structure to snap in place under a ledge at an exterior side wall of the chamber.

In certain embodiments, the body section includes a distal connector section having a distal end and the conduit attached to the distal end of the distal connector section is a double-lumen conduit, wherein fluid flows through one of the lumens and an electric cable passes through the second of the lumens.

In certain embodiments, the sensor further comprises an electric circuit, an electric cable having conductors, and a plug positioned at an end of the electric cable that connects the electric circuit in the sensor unit to a control unit, wherein the plug comprises a small printed circuit board (PCB) having an electronic circuit, conducting pads on the PCB to which the conductors in the electric cable are electrically connected, the electronic circuit including metal traces that electrically connect electronic components on the PCB to the conducting pads and to pins that are positioned and dimensioned to match channels in a modular connector, the electronic components having at least one of a passive memory component, active components for operating the at least one sensor, accumulating data, performing operations on the accumulated data, and communicating with other systems.

Also provided herein is a plug positioned at the end of an electric cable that conducts electricity from a first electrical device to a second electrical device, the plug configured to electrically connect the cable to the second electrical device, wherein the plug comprises: a small printed circuit board (PCB) having electronic components including at least one of i) a passive memory component, and ii) active components that operate sensors, accumulate data, perform operations on the accumulated data, and communicate with the second device and/or other systems; conducting pads positioned on the PCB to which conductors in the electric cable are electrically connected; pins that are positioned and dimensioned to match channels in a modular connector; and an electronic circuit positioned on the PCB, the circuit including metal traces that electrically connect the electronic components on the PCB to the conducting pads and to the pins.

All the above and other characteristics and advantages of the invention will be further understood through the following illustrative and non-limitative description of embodiments thereof, with reference to the appended drawings.

4.1 DEFINITIONS

In this disclosure of the invention, the terms "proximal" and "distal" are used in the common sense, i.e., "proximal" means "closer to the origin or source of flow of a fluid" and "distal" means "further away from the origin or source of flow". The "proximal direction", therefore, is "upstream" and the distal direction" is downstream.

4.2 BRIEF DESCRIPTION OF THE DRAWINGS

FIG. 10 shows a prior art proximal connector section that can be used to connect the proximal end of the sensor unit of FIG. 1 to a conduit;

FIG. 11 shows a distal auxiliary connector section that can be used to connect the distal end of the sensor unit of FIG. 1 to a conduit;

FIG. 12 shows an example cover of the sensor unit of FIG. 1; and

FIG. 13 shows a PCB which is a component of a plug that connects the cable of the sensor unit of FIG. 1 to a remote device.

4. DETAILED DESCRIPTION

Disclosed herein is a sensor unit that is configured to be positioned at a location in a conduit at which it is desired to measure some property of a fluid flowing through the conduit, e.g. flow velocity, color, density, viscosity, pH, concentration of gases, chemicals, or other substances such as $CO_2$ and $NO_2$ whether in a gaseous state or dissolved in a liquid, etc. The sensor unit comprises a section, called herein the body section, comprising a chamber in which the measurements are carried out, and a support structure that supports the sensor in such a way that it is always located at a given distance from the walls of the flow channel through the sensor and at the same depth relative to the fluid flowing through the sensor unit. The design of the support structure is such that the sensor's position relative thereto is reliably and repeatably reproducible at the time of manufacturing or assembly, as will be explained below. The interior of the body section is designed to minimize the turbulence of fluids flowing through it.

In order to illustrate the invention, the description and figures herein relate to an embodiment comprising a sensor unit that further comprises electronic components used to produce and sense changes in a fluid flowing in the conduit. The sensor can be any type of sensor, electronic, optical, mechanical, ultrasonic, etc. as is currently, or may in the future be, known in the art that would be mounted mutatis mutandis in the same manner as are the electronic components described herein. Many other embodiments are possible, each appropriate to its application, without deviating from the spirit of the invention described herein with reference to this embodiment.

Figure 1:
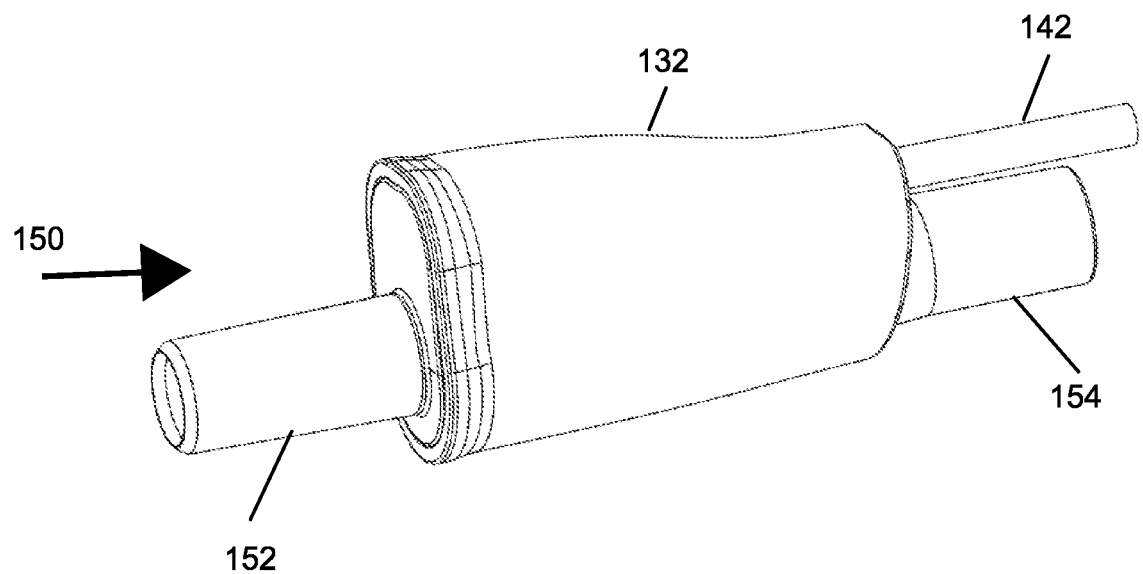
FIG. 1 is a perspective view of an embodiment of a sensor unit as disclosed herein.
Figure 2:
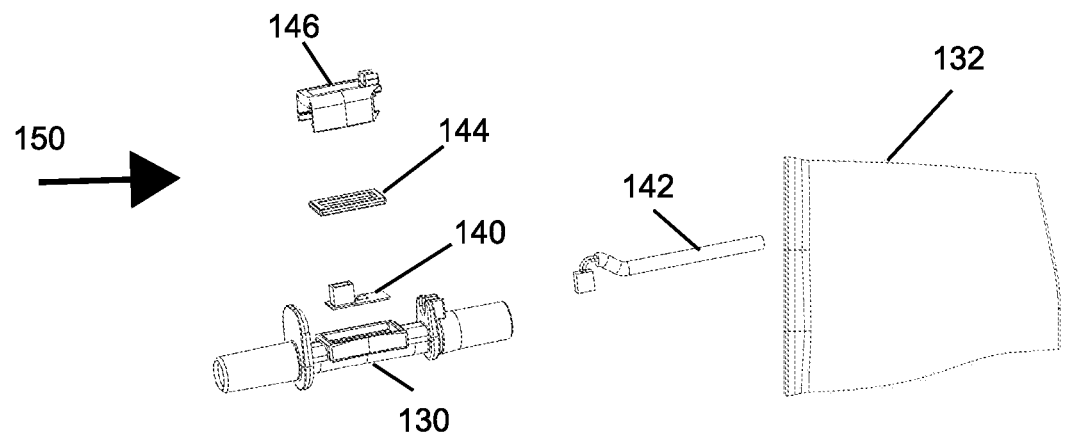
FIG. 2 is an exploded view showing the internal components of the sensor unit of FIG. 1.

FIG. 1 is a perspective view and FIG. 2 is an exploded view of a sensor unit 100. Seen in these figures are the following components, which will be described in greater detail herein below: body section 130 comprising proximal end 152 and distal end 154, cover 132, Printed Circuit Board (PCB) 140, electric cable 142, gasket 144, and snap-fit clamp element 146 (hereinafter referred to as the "clamp"). In these and the following figures arrow 150 shows the direction of fluid flow through the sensor unit.

Figure 3:
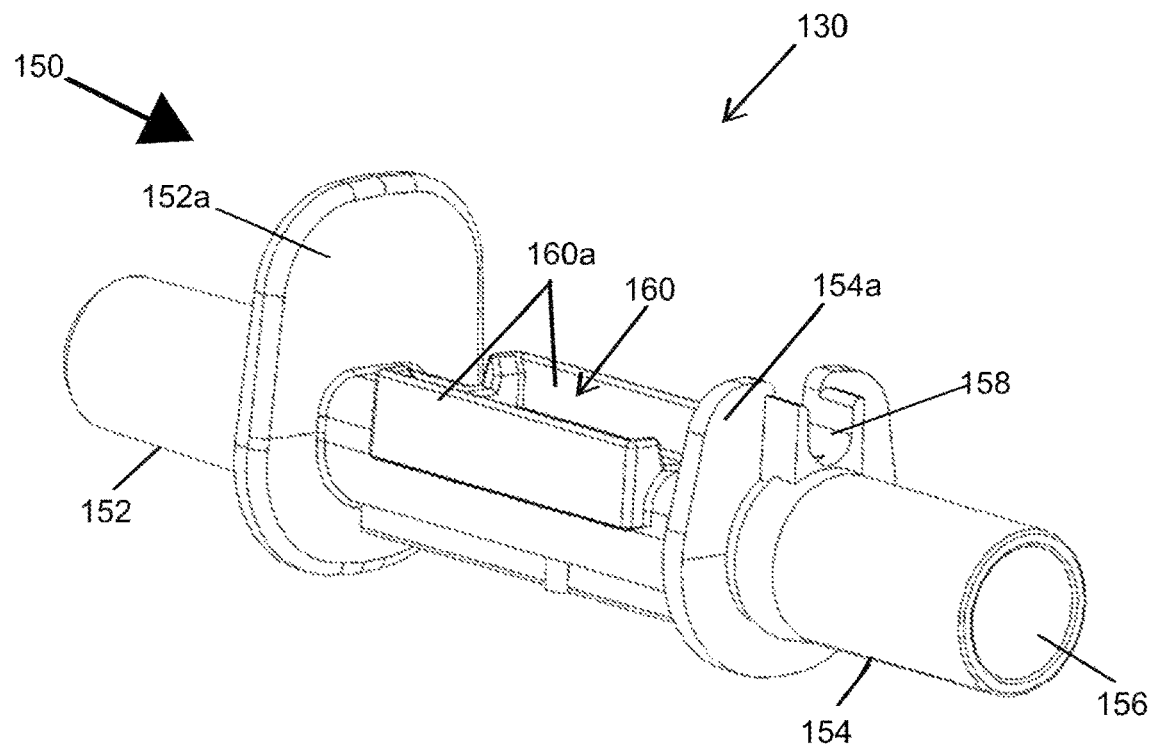
FIG. 3 is a perspective view of the body section of the sensor unit of FIG. 1.
Figure 4:
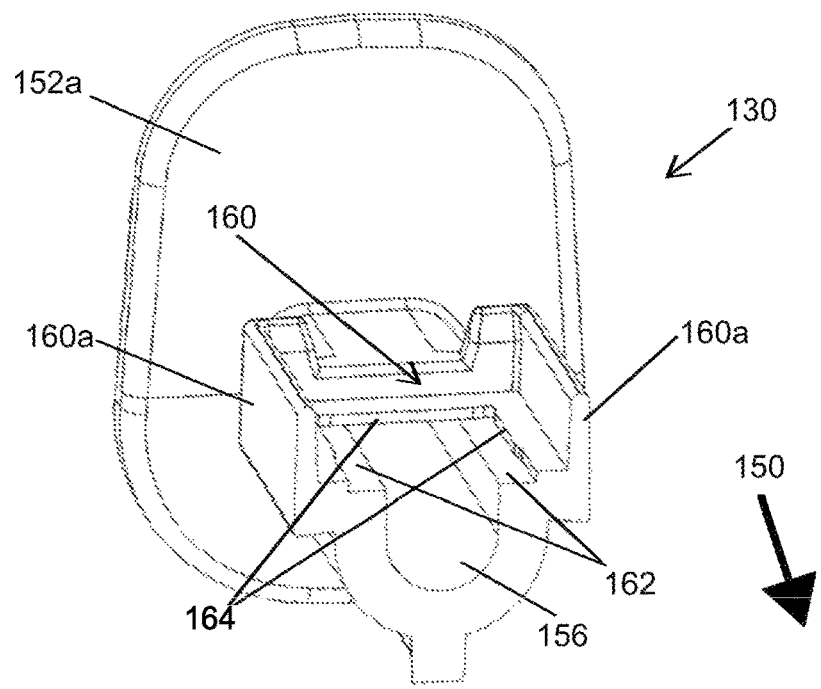
FIG. 4 is a transverse cross-sectional view of the body section of FIG. 3.

FIG. 3 is a perspective view of body section 130 of sensor unit 100 and FIG. 4 is a transverse cross-sectional view of body section 130 looking in the proximal (i.e., upstream) direction. Proximal end 152 and distal end 154 are short pieces of tube that project out of proximal wall 152a and distal wall 154a of body section 130, respectively. Proximal end 152 and distal end 154 are shaped and sized to mate respectively with a proximal connector section 126 (shown in FIG. 10) and distal auxiliary connector section 148 of sensor unit 100 (shown in FIG. 11), both of which will be described herein below. In some embodiments, either or both ends may connect directly to a conduit without a connector section. In some embodiments, the body section may be an integral part of a conduit. Different embodiments may have different shapes or sizes of the ends 152 and 154 depending on the object to which each mates. At the distal side of the body section 130 is formed a cable guide 158 that is shaped to hold in place a cable 142 that is electrically connected to a PCB 140.

It should be noted that the body section of the sensor unit may be oriented in any direction, rotating around any of the three axes. For purposes of simplicity, reference is made to the "top", "bottom", "sides", "roof", "ceiling", "wall", etc. of the body section or components thereof, it being understood that this is for convenience only and with respect to the frame of reference illustrated in the figures. With rotation, the "top" may become the "side" or "bottom", or may be at any angle of rotation around any axis, without deviating from the intent of the disclosure.

In the center of body section 130 is formed a socket 160 comprising side walls 164 into which a sensor support, which in this embodiment is a PCB 140, can be seated securely. The bottom of socket 160 over flow channel 156 is open to allow contact of the fluid flowing through flow channel 156 with sensors on the bottom of the sensor support. On the two sides of the opening are formed shelves 162 on which the sensor support (PCB 140) can be positioned to form the top of the flow channel. To prevent turbulence there are no shelves on the proximal and distal ends of the opening. The sides of the sensor support abut side walls 164 surrounding the opening so that the bottom of the sensor support will form a complete ceiling to the channel throughout the length of socket 160.

Figure 5:
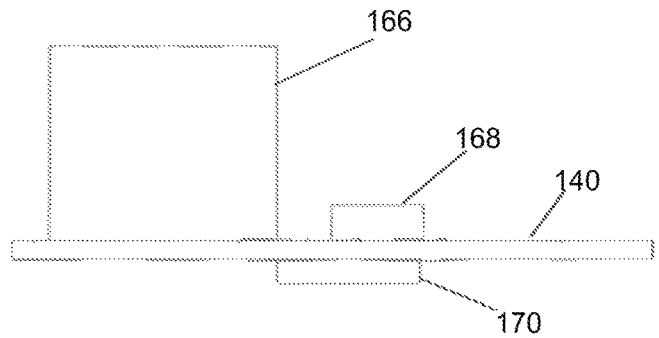
FIG. 5 is a side view of the PCB of the sensor unit of FIG. 1.
Figure 6A:
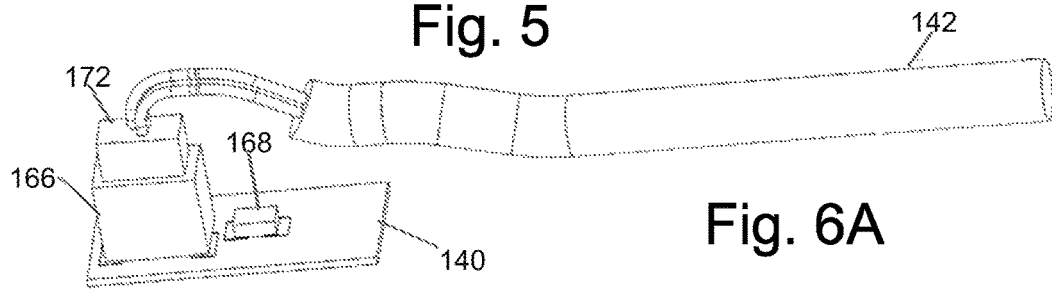
FIG. 6A and FIG. 6B are respectively upper and lower perspective views of the Printed Circuit Board (PCB) of FIG. 5 with cable attached.
Figure 6B:
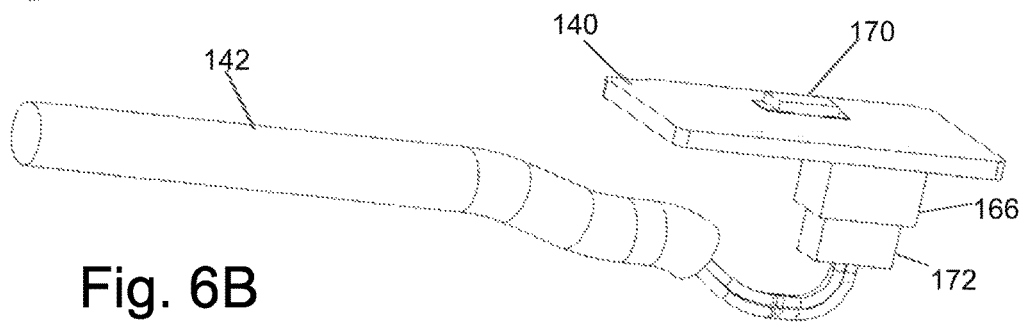

FIG. 5 is a side view of PCB 140. FIG. 6A and FIG. 6B are respectively upper and lower perspective views of PCB 140 with cable 142 attached. As shown, element 168 represents components of an electronic circuit on the PCB on the outer side of the PCB, and an element 170 represents components of an electronic circuit on the PCB on the inner side. Also shown are PCB connector 166 on the PCB 140 and cable plug 172 on cable 142. In various embodiments, components of the sensing circuit may be on either or both sides of the sensor support.

It is noted that in different embodiments of the sensor unit the PCB may comprise different types of sensor elements 170 for example: a thermistor in contact with the liquid that can be used to measure temperature (and/or provide heat); a pH sensor; a pressure sensor; one of various types of flow rate sensors; sensors to detect and/or measure the concentration of different chemicals or substances in the fluid; and sensors to detect the presence and/or concentration or types of different liquids or gases. Any one or more of these sensors of any sensor types can be added to the circuit on the PCB to measure properties of the fluid.

In other embodiments of the sensor unit, depending on the properties of the fluid that are to be measured and the type of sensor, the PCB may be replaced with a sensor-support substrate of any material e.g., metal, ceramic, or plastic plate. In some embodiments, the sensor support may not have a flat rectangular shape as described herein, but may have other two or three dimensional shapes. For example, the sensor support may form an arched ceiling to the flow chamber. The sensors need not to be attached adjacent to the surface of the sensor support as shown in the figures herein but can be attached to probes that project orthogonally (or at any angle) from the bottom of the sensor support into the fluid. In embodiments of the sensor unit several sensors may be attached to the probe to measure the same or different properties of the fluid at different distances from the sensor support. In some embodiments, a sensor may comprise components on the inside or outside of the PCB, or both. One or more sensors may also be positioned to lie flush with the surface of the sensor support or even recessed within it.

In some embodiments, the sensing circuit may comprise communication means, either wired or wireless. In some embodiments, data may be stored within the sensor unit, e.g., for later retrieval.

Figure 7:
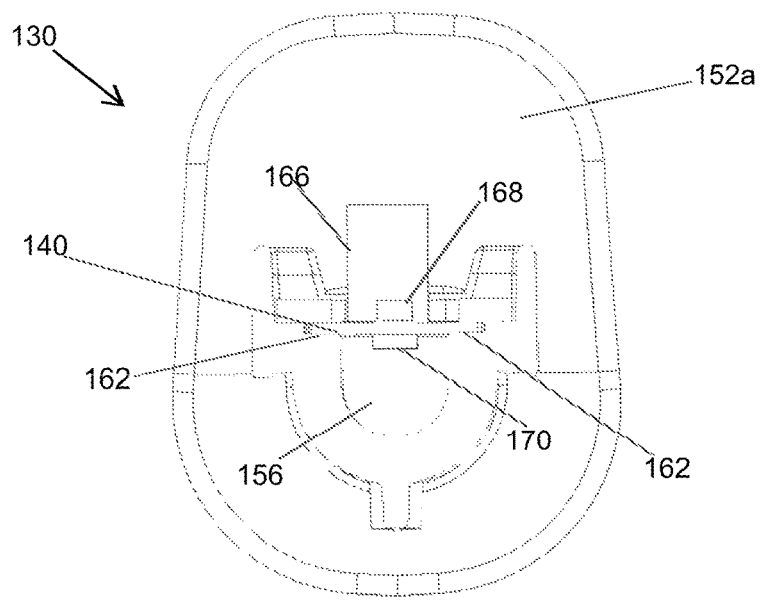
FIG. 7 is a transverse cross-sectional view of the body section of FIG. 3 with the PCB of FIG. 5 in place.

FIG. 7 is a transverse cross-sectional view of body section 130 viewed from the proximal direction, similar to FIG. 4, with the PCB 140 in place on shelves 162 creating a U-shaped portion of flow channel 156 in which the measurements are made. From this figure it can be seen that placing the bottom of PCB 140 in direct contact with the shelves 162, and using the bottom of the PCB as the top of the flow channel, ensures that the internal sensor component 170 is inserted the exact same depth into the fluid, providing consistent and accurate measurements. In some implementations, this may require the U-shaped portion of flow channel 156 to be full of the flowing liquid, or gas at a certain pressure when measurements are made. This can be accomplished, for example, by use of a check valve in a fluid tube downstream of body section 130. The U-shaped sides and flat top of the portion of the flow channel at which the measurements are made provide maximum contact of the sensors with a flowing fluid without creating eddies and other disturbances to the flow.

Gasket 144 (see FIG. 9) is placed on top of PCB 140 instead of the conventional practice in which a gasket is placed between PCB 140 and the shelves 162. The gasket is placed on top of the PCB to allow reproducible insertion of the element 170 in the liquid that could not be accomplished if the gasket were under the PCB (i.e., between the PCB 140 and the shelves 162). If the gasket were in the conventional arrangement between the PCB and the shelves the variable compressibility of the gasket would influence the position of the sensors relative to the conduit. By placing the sensor support directly upon the shelves, this variability is avoided. The shelves thus form a reference plane, relative to which the sensor position may be accurately and reproducibly set.

Selection of suitable materials for the gasket is helpful for optimal sealing characteristics. When the clamp 146 is applied, as will be discussed with respect to FIG. 9, a balance can be achieved between the amount of pressure applied (not too high) and the amount of deformation achieved (i.e., enough to keep the elastomer in contact with the surface, but not so much as to lose its compliance). It is helpful to minimize the force for achieving a consistent deformation that can hold over time, temperature, and, for example, for medical applications, ETO (Ethylene Oxide), radiation or other methods of sterilization. In certain embodiments, silicon rubber gaskets with a suitable durometer value and appropriate compression characteristics (achieving compression without undue force) can be used. Also the thickness of the gasket was chosen so that when the clamp 146 is attached to body section 130 the gasket prevents leakage by being slightly compressed without requiring too much force.

In certain embodiments, a layer of adhesive can be added to the side of gasket 144 that creates the sealing surface. The adhesive layer can hold the gasket in place on the PCB for the assembly process and also fill in any imperfections of the sealing surfaces. Together these aspects secure a leak-free seal between the PCB 140, side walls 164 of the recess 160 and the clamp 146.

Figure 8:
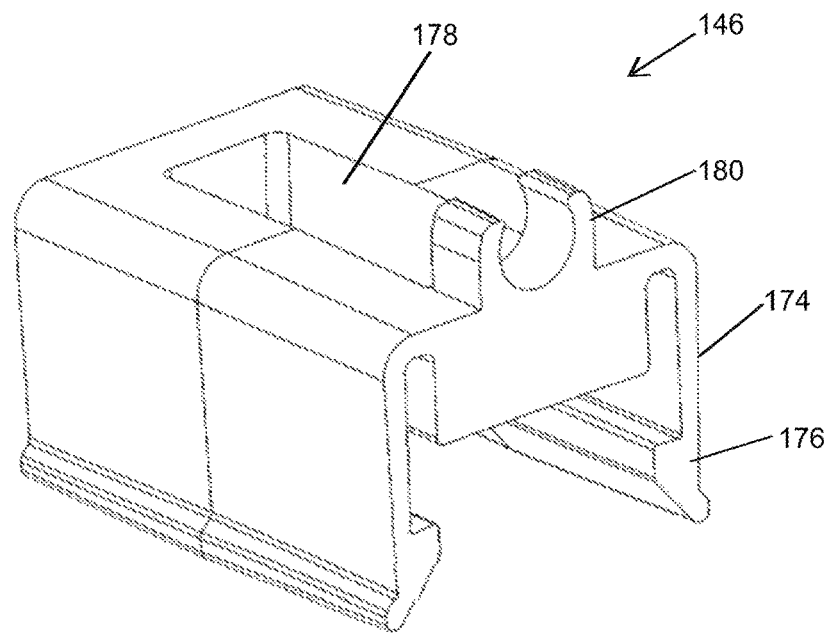
FIG. 8 is a perspective view of the snap-fit clamp element of the sensor unit of FIG. 1.

FIG. 8 is a perspective view of an embodiment of a clamp 146. Clamp 146 comprises a top 173 having an opening 178 through which the cable 142 can pass to connect to the PCB, a cable guide 180, and two snap-fit legs 174 which extend perpendicularly from the top 173 of the clamp. Each of the snap-fit legs 174 has a latch structure 176 on its free end configured to enable snapping the clamp 146 into position and holding it securely. The latch structures 176 can be wedge-shaped elements as shown or can have other shapes.

Figure 9:
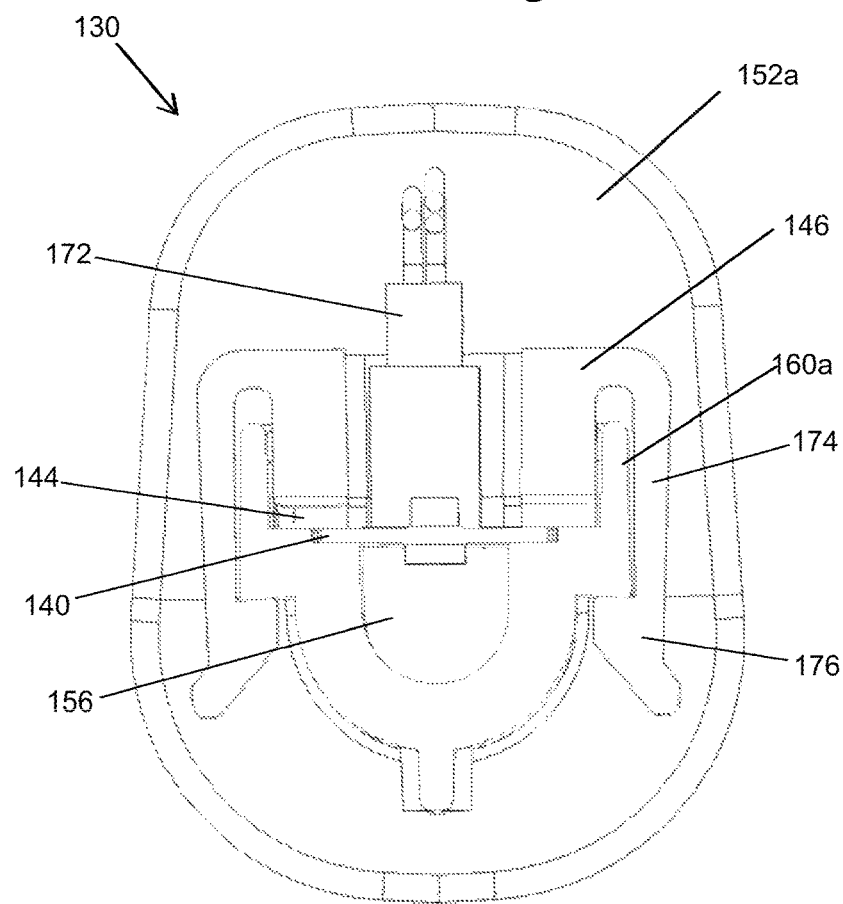
FIG. 9 is a transverse cross-sectional view of the body section of FIG. 3 with the PCB of FIG. 5, a gasket, and the clamp of FIG. 8 in place.

FIG. 9 is a transverse cross-sectional view of body section 130 viewed from the proximal direction, similar to FIG. 7 with gasket 144 and clamp 146 in place. As shown in this figure, the snap-fit legs 174 are made to deform to pass over side walls 160a during the assembly process and snap in place when they reach a ledge under side walls 160a where the latch structures 176 engage. When latch structures 176 engage, the clamp 146 presses down firmly on gasket 144, which slightly compresses against PCB 140, sealing the top of U-shaped flow channel 156. In the depicted embodiment, the latch structures 176 have a back bevel, e.g. five degrees, to help keep the snap-fit legs from moving off the clamping surface over time or during use.

In certain embodiments, the clamp member 146 has sufficient rigidity to maintain compression on the gasket over time, and through various temperature changes and chemical exposure. In certain embodiments, the clamp is designed to remain within plastic deformation limits and to not elastically deform at a given application embodiment's temperature, time and chemical exposure limits. These requirements apply also to all other components except the PCB and cable of electronic sensor unit 100. In certain embodiments, the clamp can be made from polycarbonate material.

FIG. 10 schematically shows a prior art proximal connector section 126 that can be attached to sensor unit 100 in order to connect the sensor unit to a plastic or rubber tube. The proximal end 126a is a hollow tube having a uniform diameter inner surface and tapered outer surface with several circumferential ledges created on it. In this embodiment proximal end 126a is dimensioned to fit into and firmly grip the inside of the distal end of elastomeric tubing, thereby firmly attaching proximal connector section 126 to the tubing. In other embodiments the proximal end 126a can have a different structure, depending on the type of conduit to which the sensor unit is to be attached. In this embodiment the central portion of proximal connector section 126 comprises a sample port 128.

In certain embodiments, the proximal end 152 of body section 130 is a hollow tube whose outer diameter is dimensioned to fit into the distal end 126b of connector section 126. An adhesive between the inner diameter of proximal end 126b and the outer diameter of distal end 152 can be used to create a leak proof connection holding the distal connector section 126 and body section 130 firmly together.

FIG. 11 shows an auxiliary distal connector section 148 that can be attached to sensor unit 100 in order to connect the sensor unit to a conduit through which the fluid continues to flow after passing through the sensor unit 100. In the embodiment shown, the proximal end 148a of auxiliary distal connector section 148 is a cylindrical tube having an outside diameter dimensioned to fit inside of the distal end 154 of body section 130.

An adhesive layer between the inner diameter of distal end 154 and the outer diameter of proximal end 148a can be used to create a leak proof connection holding the distal connector section 148 and body section 130 firmly together. The distal end 148b of distal connector section 148 is configured to connect to a conduit through which fluid continues to flow after passing through the sensor unit 100.

Sides 182 that are part of distal auxiliary connector section 148 over distal end 148b are formed to fit tightly over and firmly grip the conduit through which the fluid continues to flow after passing through the sensor unit 100 to form a leak proof connection between auxiliary distal connector section 148 and the conduit. An adhesive further ensures against leakage. In this embodiment, the tops of sides 182 are curved to form the sides of an open channel 184 through which cable 142 passes into a dedicated lumen of a double-lumen tube. The sides of channel 184 are configured to grip said cable lumen of a double-lumen tube.

Embodiments of the conduit through which the fluid continues to flow after passing through the sensor unit 100 comprise double-lumen tubing in which one lumen is connected to distal end 148b of distal auxiliary connector section 148 as described above. Cable 142 passes through the second lumen, the proximal end of which is firmly gripped by the sides of open channel 184. This embodiment is advantageous in many applications, for example when the sensor unit is used inline in a urinary catheter. In this application it allows convenient guiding of the cable away from the patient providing greater comfort to the patient and greater convenience to the nurses.

It is noted that in some embodiments the sensor unit can be manufactured as an integral component of a conduit rendering one or both of proximal connector section 126 or auxiliary distal connector section 148 unnecessary.

FIG. 12 shows an embodiment of the cover 132 of sensor unit 100. During assembly, after PCB 140 and gasket 140 have been inserted into body section 130 and held in place by clamp 146, and cable 142 is electrically connected to the PCB, cover 132 can be slid over the assembled body section 130. Proximal end 132a of cover 130 then snaps onto proximal wall 152a of body section 130 and distal end 132b of cover 132 snaps into distal wall 154a of body section 130. In one embodiment, inside the opening on the front of distal end 132b of cover 132 over cable guide 158 (see FIG. 3) there is a tab (not shown) that presses down on the cable in cable guide 158 to provide strain relief preventing the cable from being pulled and disconnected from PCB 140.

Another feature of embodiments of electronic sensor unit 100 is the plug at the distal end of cable 142 that electrically connects the circuit on PCB 140 with a control unit. In the embodiment described here, the plug is a modular connector, commonly known as a Registered Jack connector. In this embodiment an 8P8C modular connector, commonly known as RJ45 plug, of the type that is commonly used to connect telecommunications or data equipment, is used. In FIG. 13 a PCB 186 is shown, which is dimensioned to fit wholly or at least partially inside the RJ45 connector, making its presence unobtrusive. The entire RJ45 plus PCB assembly can be over-molded making a convenient and conventional-appearing plug.

In the embodiment described herein, cable 142 comprises three wires and shielding. Instead of crimping exposed ends of the wires in cable 142 directly to the pins as is done in a conventional RJ45 plug, the conductors are electrically connected (e.g., soldered) to four pads 194 on PCB 186. Metal traces on the PCB conduct electricity to conducting pads 190 to which pins 188 are electrically connected, e.g., by soldering, welding, or gluing with electrically conducting epoxy glue. These pins are positioned and dimensioned to match the channels in a modular connector and are firmly crimped into position using the usual tools and techniques associated with modular connectors. Following this step, the entire assembly can be over-molded to provide a finished appearance.

PCB 186 also includes an electronic circuit 196 that comprises, in this embodiment, inter alia a passive memory component. This circuit comprises, in this embodiment, inter alia, product information identifying the model number, date of manufacture, etc. of the electronic sensor unit 100 and usage data that can be used to manage various aspects of the sensor unit's operation, e.g., store accumulated data and/or control the amount of time that the electronic sensor unit 100 can be used, e.g. to prevent performance degradation or to enforce compliance with good practices. Other embodiments may include active components that operate the sensor(s), accumulate data, perform operations thereon, communicate with other systems and so forth. In other embodiments other numbers of wires may be connected to PCB 186. This PCB design may be applied in any application wherein a modular connector of any sort is used on a cable and an unobtrusive inline electronic circuit is desired.

The dimensions and the distal and proximal connector sections of sensor unit 100 can be adapted mutatis mutandis to enable insertion or integration of the sensor unit into a conduit of any size for a wide range of applications. For example, the proximal connector section of sensor unit 100 described herein above can be connected to an indwelling urinary catheter inserted into the bladder of a bedridden patient and the distal connector section of sensor unit 100 connected to tubing that leads to a urine collection container. In this application, sensor unit 100 can be used for urine monitoring. In food production the sensor unit can be used to check that a liquid ingredient is fully homogenized by placing sensors at various depths to see if they all give the same reading. In an automotive exhaust, pipe sensor units can be placed to check emission levels or other properties of the gases. In an open conduit of fixed orientation, wherein liquid flows (or a closed conduit where the liquid may not entirely fill the conduit), sensor units may be mounted on sensor support in the floor and/or projecting up into the liquid flowing therein to measure presence or properties of the fluid at various depths. Other examples of such applications include pipes or conduits for wine in a wine bottling plant, for molten chocolate in a candy factory, for molten steel in a foundry, for molten plastic in an extrusion application, for water in an irrigation canal or a drainage ditch, and others.

It is noted that the elements of the electronic sensor unit are constructed, for example with snap-fit features, that enable the sensor to be disassembled and reassembled on as-needed basis for medical procedures, adjustments, and repair.

Although embodiments of the invention have been described by way of illustration, it will be understood that the invention may be carried out with many variations, modifications, and adaptations, without exceeding the scope of the claims.

The invention claimed is:

1. An electronic assembly comprising:
   a) a printed circuit board (PCB);
   b) an electronic circuit created on the PCB; and
   c) electricity-conducting pads positioned on the PCB to which the electronic circuit and electricity conducting pins are electrically connected;
   the electronic assembly characterized in that:
   i) the electronic assembly is configured to be embedded in a modular connector plug; and
   ii) the electricity conducting pins are positioned and dimensioned to match channels in the modular connector plug.

2. The electronic assembly of claim 1, wherein the electronic circuit comprises electronic components including at least one of:
   a) at least one passive component;
   b) at least one active component; and
   c) both at least one passive and at least one active component.

3. The electronic assembly of claim 1, wherein the electrical connection between the electricity conducting pins and the electronic circuit is by at least one of: soldering, welding, or gluing with electrically conducting glue.

4. The electronic assembly of claim 1, comprising electricity conducting pads positioned on the PCB, the electricity conducting pads configured to electrically connect the electronic assembly to one of: a) electricity conducting wires in an electric cable; and b) electricity conducting wires and shielding in an electric cable.

5. The electronic assembly of claim 4, wherein one of: a) the electricity conducting wires in an electric cable; and b) the electricity conducting wires and the shielding in an electric cable are electrically connected to electricity conducting pads on the PCB.

6. The electronic assembly of claim 5, wherein one of: a) the electricity conducting wires in the electric cable; and b) the electricity conducting wires and the shielding in the electric cable are electrically connected to the electronic circuit by at least one of: soldering, welding, or gluing with electrically conducting glue.

7. A modular connector plug comprising an embedded electronic assembly according to claim 1.

8. A modular connector plug comprising an embedded electronic assembly according to claim 5.

9. The modular connector plug of claim 7, wherein the electronic assembly is introduced into a hollow interior of a modular connector plug such that the electricity conducting pins slide into channels in the modular connector plug.

10. The modular connector plug of claim 8, wherein the electronic assembly is introduced into a hollow interior of a modular connector plug such that the electricity conducting pins slide into channels in the modular connector plug.

11. The modular connector plug of claim 9, wherein a crimping tool is used to crimp one or more contact pins of the modular connector plug onto one or more electricity conducting pins of the electronic assembly in one or more channels of the modular connector plug, thereby establishing electrical connection between the electronic circuit on the PCB and one or more contacts of the modular connector plug.

12. The modular connector plug of claim 10, wherein a crimping tool is used to crimp one or more contact pins of the modular connector plug onto one or more electricity conducting pins of the electronic assembly in one or more channels of the modular connector plug, thereby establishing electrical connection between the electronic circuit on the PCB and one or more contacts of the modular connector plug.

13. The modular connector plug of claim 9, wherein the modular connector plug and embedded electronic assembly are over-molded.

14. The modular connector plug of claim 10, wherein the modular connector plug and embedded electronic assembly are over-molded.

15. The modular connector plug of claim 9, wherein the modular connector plug is a Registered Jack connector.

16. The modular connector plug of claim 10, wherein the modular connector plug is a Registered Jack connector.

17. The modular connector plug of claim 15, wherein the modular connector plug is an RJ45 plug.

18. The modular connector plug of claim 16, wherein the modular connector plug is an RJ45 plug.

\* \* \* \* \*